United States Patent
Ihara et al.

(10) Patent No.: US 6,687,614 B2
(45) Date of Patent: Feb. 3, 2004

(54) NAVIGATION DEVICE, INFORMATION DISPLAY DEVICE, OBJECT CREATION METHOD, AND RECORDING MEDIUM

(75) Inventors: Koji Ihara, Chiba (JP); Nobuhiro Ozu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/132,591

(22) Filed: Apr. 25, 2002

(65) Prior Publication Data

US 2002/0177944 A1 Nov. 28, 2002

(30) Foreign Application Priority Data

May 1, 2001 (JP) ........................... P2001-134580

(51) Int. Cl.[7] .............. G05D 1/00; G06F 7/00; G06F 19/00
(52) U.S. Cl. .............. 701/209; 701/211; 701/213; 701/201; 340/995.14; 340/988; 345/619; 345/173; 348/118; 342/357.13
(58) Field of Search ................. 701/208, 211, 701/209, 201, 207, 213, 200, 25, 26, 23, 28; 340/990, 995.1, 988, 995.14; 345/963, 819, 173, 629, 427, 810, 821, 100, 98; 348/118; 342/357.13

(56) References Cited

U.S. PATENT DOCUMENTS

| | | | | |
|---|---|---|---|---|
| 5,739,772 A | * | 4/1998 | Nanba et al. | 340/990 |
| 5,982,301 A | * | 11/1999 | Ohta et al. | 340/995 |
| 5,983,158 A | * | 11/1999 | Suzuki et al. | 701/209 |
| 6,041,281 A | * | 3/2000 | Nimura et al. | 701/211 |
| 6,070,124 A | * | 5/2000 | Nimura et al. | 701/211 |
| 2002/0044065 A1 | * | 4/2002 | Quist et al. | 340/815.4 |
| 2002/0075243 A1 | * | 6/2002 | Newton | 345/173 |
| 2002/0170056 A1 | * | 11/2002 | Akiyama et al. | 725/35 |

* cited by examiner

Primary Examiner—Thomas G. Black
Assistant Examiner—Ronnie Mancho
(74) Attorney, Agent, or Firm—Jay H. Maioli

(57) ABSTRACT

A navigation device, an information display device, an object creating method, and a storage medium, in which a display unit, which is integrally formed with a touch panel, displays a map together with control buttons, including a mark setting button and a mark erasing button, which have specific processing associated therewith. When coordinates for a desired point on the map and a mark button are specified on the touch panel, a mark creating unit creates a mark object and displays it at a position on a map corresponding to specified coordinates.

9 Claims, 16 Drawing Sheets

NAVIGATION DEVICE, INFORMATION DISPLAY DEVICE, OBJECT CREATION METHOD, AND RECORDING MEDIUM

BACKGROUND OF THE INVENTION

1. Field of the Invention

The present invention relates to a navigation device and an information display device in which objects such as marks, etc. are displayed on a map, and to an object creating method therefor.

2. Related Art

In recent years, navigation devices that can obtain their position and moving speed in real time by using GPS (Global Positioning System) satellites orbiting at high altitude have started to come into widespread use, either installed in moving objects, such as automobiles, or for portable use.

In these navigation devices, a map is displayed on a monitor on the basis of digitized map data. In particular, navigation devices installed in moving objects are provided with a route guidance function based on a route that has been set by the user. When the user sets the route, he or she designates a departure point, a destination point, and an intermediate point along the route.

When the user designates the departure point, the destination, and so forth when setting the route, a remote controller, functioning as input means, is normally used. The series of operations that the user performs using the remote controller during route setting are described with reference to FIGS. 14A to 14C.

As shown in FIG. 14A, the user first selects a "Routing" menu C1 from a plurality of menus (operation 1). Thereupon, as shown in FIG. 14B, a plurality of routing-related menus C2 to C4 are displayed on a display unit 12, and then the user selects a "set route" menu C2 (operation 2). As a result, the apparatus enters a route setting mode, as shown in FIG. 14C. In this route setting mode, after the user selects, for example, a "destination" menu C6 (operation 3) and designates the desired destination (operation 4), he or she pushes an execute key (not shown in the drawing) to set the destination (operation 5). Thereupon, as shown in FIG. 15, a checkered-flag object Od, for example, is created on a map M displayed on the display unit 12.

In operation 4 described above, when the user designates the destination by using the map M displayed on the screen, operations such as those described in the following are performed.

As shown in FIG. 16A, a point T is always displayed at a predetermined position of the screen of the navigation device, for example, at the center. When the user wishes to set, for example, a point F encircled by the dotted line in FIG. 16A as the destination, he or she performs a predetermined operation using the remote controller to make the map M scroll, and the point F, which he or she wants to set as the destination, is made to coincide with the point T, as shown in FIG. 16B. After this, by performing the destination setting in operation 5, the point F, which coincides with the point T, is set as the destination and then, as shown in FIG. 16C, an object Od, which indicates the destination, is created and displayed.

The user can also attach marks to arbitrary points on the map M. In order to attach these marks, in the same manner as in the case of setting the destination on the map M, the user scrolls the map M to make the desired position coincide with the point T on the screen, and then performs a predetermined operation from the menus to create a mark.

Incidentally, touch panels are often used recently as the input means, instead of the remote controller. In navigation devices that are provided with these touch panel input means, the touch panel is integrally provided on the entire surface of the display unit 12, and thus, by tapping on the touch panel with a pen or a finger, it is possible to operate a tree-structured menu system that is displayed on the touch panel. With such a touch panel, although it is possible to intuitively perform cursor movement and setting operations using a pen or a finger, the basic operation is the same as in the case of the remote controller.

When setting, for example, the destination and so forth in the case where the input means is either the remote controller or the touch panel, it has been necessary to perform operations 1 to 5 sequentially. In other words, in order for the user to smoothly perform the above-mentioned series of operations, it has been necessary for him or her to learn certain operations. For example, when setting the destination, it has been necessary for the user to roughly understand where the "destination" menu C6 is located within the tree-structured operation menus. Even though the manufacturer puts a lot of effort into designing the display content (text) of the menus and the tree structure of the operation menus to improve ease of use, this does not necessarily mean that the user can perform operations intuitively. Moreover, when an operation is executed by mistake, the user must redo the whole operation again from the beginning, which may cause the user to feel that this is troublesome.

In order to perform other functions, such as erasing created objects or obtaining detailed information about points on the map to which objects have been added, it has of course been necessary to perform several predetermined operation steps.

Furthermore, when making the point T on the screen coincide with a desired position by scrolling the map M and then creating a mark, making the point T coincide with the desired position is not necessarily achieved by a single action. Therefore, in some cases the user may be forced to perform the same actions many times, as well as the action for scrolling the map M, which is one reason for the user to experience difficulty.

SUMMARY OF THE INVENTION

The present invention has been made in view of such technical problems and has as an object the provision of a navigation device, an information display device, and an object creation method in which the creation of object marks, setting of the destination, and so forth can be performed by intuitive operations, thus providing superior ease of use.

In a navigation device according to the present invention, when a button object and desired coordinates on a map are specified, a mark is created and displayed on the map at a position corresponding to the specified coordinates. In other words, in the navigation device of the present invention, button objects having specific processing associated therewith are displayed on a display unit along with a map. Then, when a button object and desired coordinates on the map are specified on the touch panel, a mark creating processor creates a mark and displays the mark on the map at a position corresponding to the specified coordinates. In general, the mark is a visually recognizable object that indicates, for example, a favorite place, a destination, or an intermediate point along the route.

In the navigation device of the present invention, when a button object and coordinates corresponding to a mark displayed on the map are specified, it is also possible to erase the mark. Likewise, when a button object and coordinates corresponding to a mark displayed on the map are specified, it is also possible to output mark-related information. If the place where the mark is attached is, for example, any type of establishment or store, the mark-related information is guide information such as the hours of business, the days on which the store is closed, the address, the telephone number, a photograph (image) of that place, and so forth. This information should preferably be associated with the mark and stored in advance in a predetermined data storage unit such as a recorded disk, etc. This mark-related information may be output onto a display unit in the form of text or images, or alternatively, the mark-related information may be output as voice information from a speaker.

In the navigation device of the present invention, a button object and desired coordinates on the map can be specified by performing a drag operation between the button object and the desired coordinates on the map. A drag operation is one operation method for giving an instruction to a computer, and in the present invention, the term drag operation refers to the action of moving a pen or finger on a touch panel while keeping the pen or finger in contact with the touch panel.

Moreover, in the navigation device of the present invention it is possible to specify a button object and desired coordinates on a map while keeping the map fixed, that is to say, without scrolling the map.

Furthermore, the present invention provides an information display device in which, when one of the starting position and the ending position of an input line segment coincides with a command button, editing of an object at the other one of the starting position and the ending position that does not coincide with the command button is performed. In other words, when input means receives an input in response to an external contact, position detection means detects the starting position and the ending position of the input line segment. Then, when the line segment starting position or the ending position detected by the position detection means coincides with a command button displayed on a portion of the display area of display means, command execution means performs editing of an object on the image corresponding to the starting position or the ending position. The object editing referred to here means object creation, creation of object-related information, object erasing, and so on. Object-related information means object-related information that is associated with the object and stored. If the place where the object is attached is the home of an acquaintance, the object-related information is the name, address, telephone number, and so forth of that person.

The information display device of the present invention is, for example, a navigation device; but in addition to this, it may be a mobile terminal device such as a PDA (personal digital assistant), a notebook computer, or a mobile telephone, or it may be a personal computer and so forth.

In the information display device of the present invention, a map is displayed as an image on the display means and object editing of the mark on the map can be performed. However, it is also possible for the image on the display means to be an image other than a map.

Moreover, in the information display device of the present invention, desired coordinates inside a region where the command buttons are not displayed may be specified. Accordingly, by linking a command button and coordinates inside a region where command buttons are not displayed, the user can easily perform editing of an object at a position corresponding to an area other than the command buttons.

When a command button for creating an object is displayed on the same screen as the screen on which a map is displayed, and then the position corresponding to the command button and a point on the map are specified, an object creation method according to the present invention creates an object at that point on the map. Thus, with the object creation method of the present invention, it is possible to specify a command button and a point on the map, which are displayed on the same screen.

In the present invention, it is also possible to provide a recording medium which stores a program for executing the processing described below on a computer with a touch panel input device. In other words, with the program stored in this recording medium, a map and a predetermined area for performing editing of an object can be displayed on the same screen. Then, when a drag operation is performed on the touch panel between the predetermined area and a desired point on the map, a line segment input in that drag operation is received, and when the starting point coordinates or the ending point coordinates of the line segment are positioned inside the predetermined area, editing of the object on the map at the starting point coordinates or the ending point coordinates is executed.

DESCRIPTION OF THE PREFERRED EMBODIMENT

A detailed description of the present invention is given below on the basis of a preferred embodiment illustrated in the attached drawings.

Figure 1:
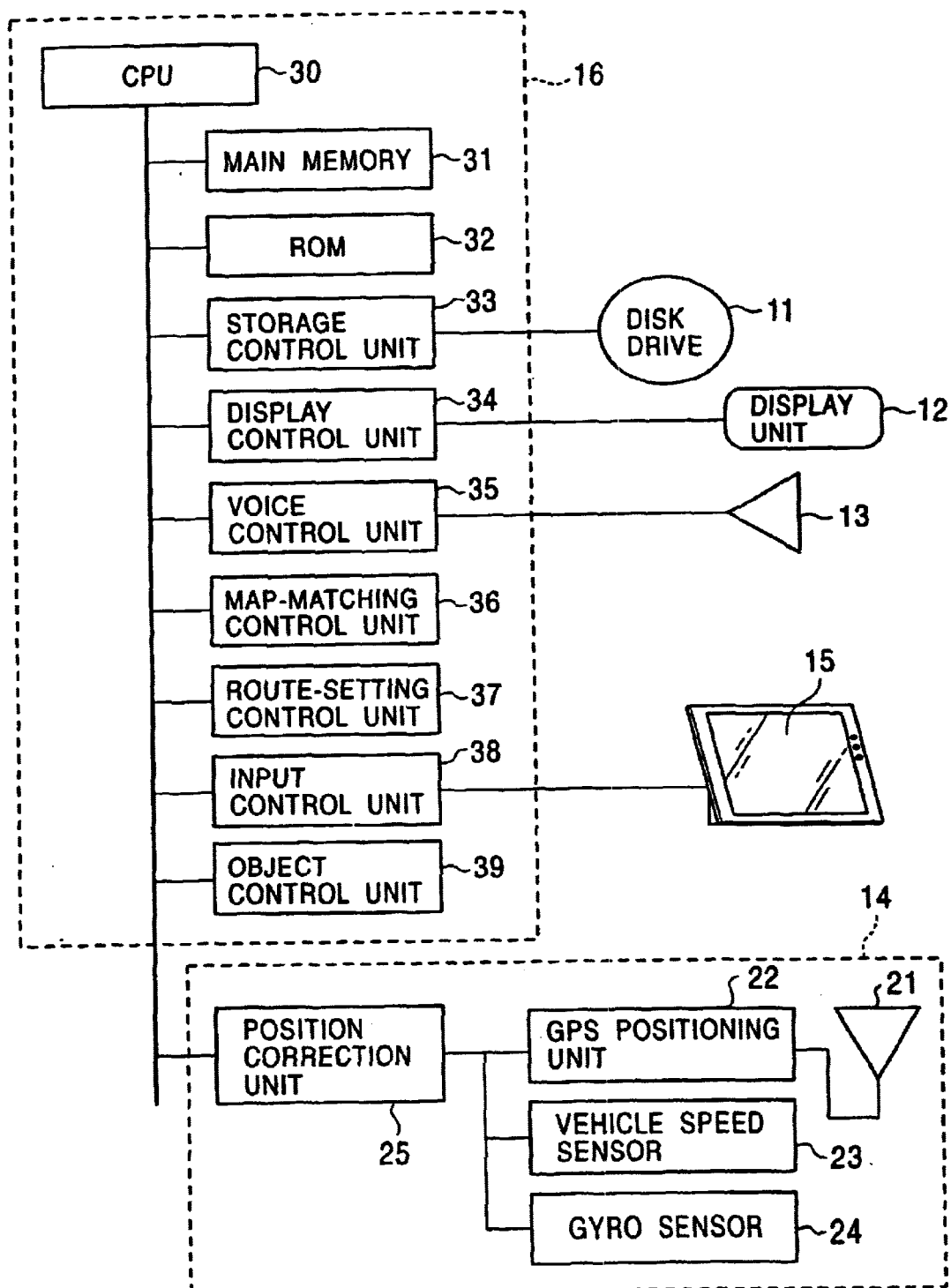
FIG. 1 shows the structure of a navigation device according to the present invention.

FIG. 1 is a block diagram for explaining the overall structure of a navigation device according to the embodiment of the present invention.

As shown in FIG. 1, the navigation device of the embodiment of the present invention is configured by providing a disk drive 11 in which a recorded disk, such as a CD-ROM (compact disk read only memory) or a DVD (digital versatile disk), containing map data covering a predetermined wide region is loaded; a display unit (display means or display screen) 12 formed of, for example, a liquid crystal display monitor for displaying a map and a graphical user interface; a speaker 13 for outputting voice guidance; a positioning block 14 for performing position measurement of the vehicle's location; a touch panel (input unit or input means) 15 for detecting stylus pen (hereinafter simply referred to as "pen") or finger input operations; and a control block 16 for controlling the entire device.

The positioning block 14 is provided with a GPS antenna 21 for receiving signals transmitted from GPS satellites, a GPS positioning unit (positioning means) 22 for performing position measurement on the basis of the signals obtained from the GPS antenna 21, a vehicle speed sensor 23 for detecting the speed of the vehicle (moving object) in which the navigation device is installed, a gyro sensor 24 for detecting the rotational position of the vehicle, and a position correction unit 25 for correcting the positioning result from the GPS positioning unit 22 on the basis of output values obtained from the vehicle speed sensor 23 and the gyro sensor 24.

The control block 16 is provided with a CPU 30 for performing arithmetic processing and control of the overall system; a main memory, functioning as an internal storage device, formed of, for example, a DRAM (dynamic random access memory); a ROM 32 in which a predetermined program for operating the navigation device is stored; a storage control unit 33 for controlling the disk drive 11 and so forth; a display control unit (also referred to as object display control unit or command button display means) 34 for controlling the image displayed by the display unit 12; a voice control unit 35 for controlling the voice which is output from the speaker 13; a map-matching control unit 36 for performing so-called map-matching processing in which the vehicle position measured by the positioning block 14 is matched with a route on the map displayed on the display unit 12; and a route setting control unit 37 for calculating a recommended route based on a departure point and a destination set by the user.

Figure 2:
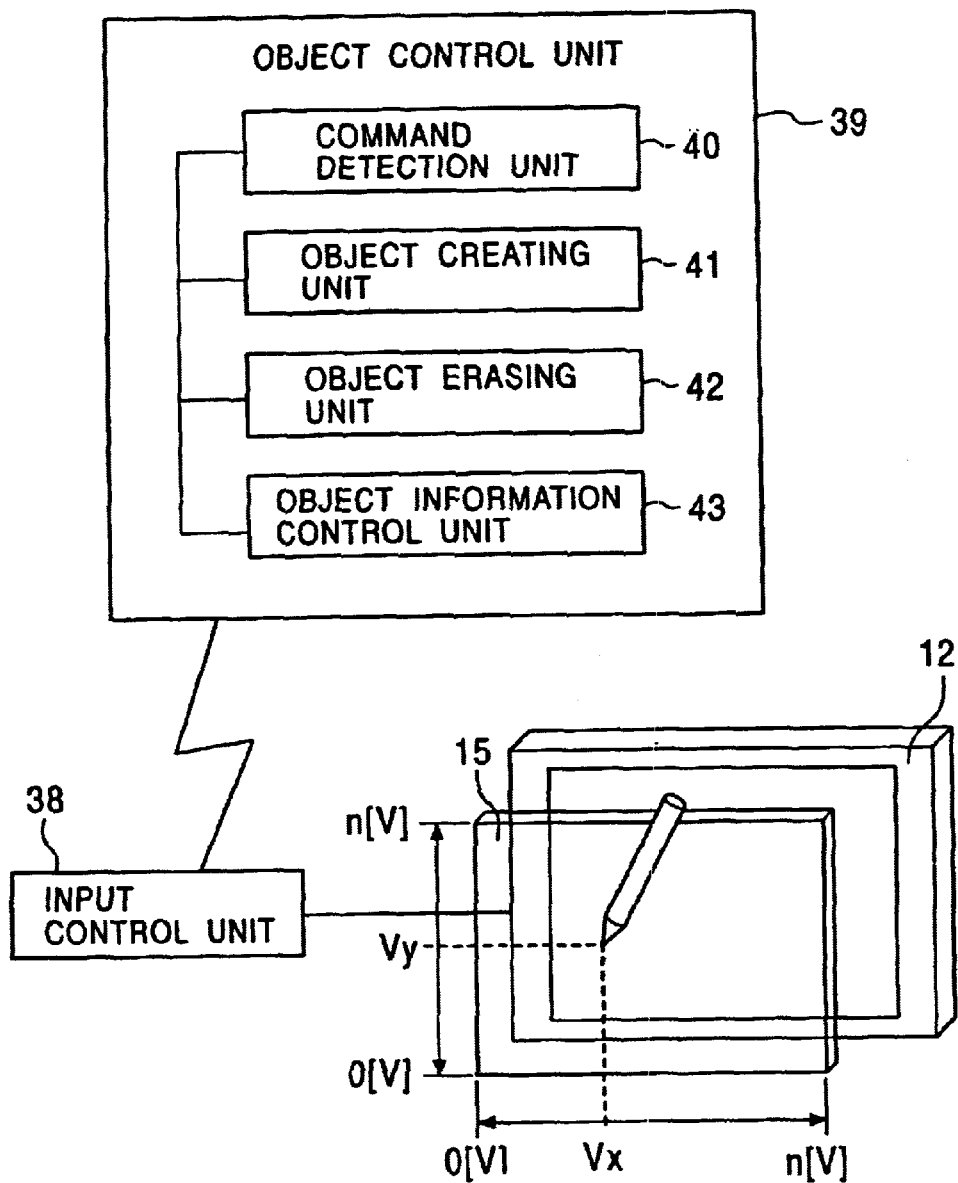
FIG. 2 shows the structure of an object control unit.

As shown in FIG. 2, the touch panel 15 is integrally disposed on the front surface of the display panel 12. The touch panel 15 covers the display screen of the display unit 12 and is provided with transmissive electrodes, which are formed on two sheets of film or glass, which are made to face each other and are joined together. When a pen or finger (hereinafter, simply finger is used for the sake of convenience) touches the touch panel 15, the touch panel 15 detects the point of contact (touch position) of the finger on the display screen by detecting a horizontal voltage Vx and a vertical voltage Vy, which vary depending on which portion of the mutually opposing transmissive electrodes contact each other.

Instead of the touch panel 15, it is also possible to use another type of touch panel that performs position detection based on changes in electrostatic capacitance or one that performs position detection by using a plurality of infrared beams forming a matrix.

The control block 16 is provided with an input control unit (position detection unit) 38, which controls the input signals from the touch panel 15.

When the touch position (finger contact position) voltages, that is, the touch position horizontal voltage Vx and vertical voltage Vy, are input from the touch panel 15, the input control unit 38 performs analog-to-digital (A/D) conversion of these input voltages. Then, the A/D-converted voltages are converted to touch position coordinates x and y according to the resolution of the display unit 12, and are output to an object control unit (command execution unit) 39. When the user performs a drag operation, that is, when the user moves his or her finger while keeping the finger in contact with the touch panel 15, the input control unit 38 detects starting point coordinates and ending point coordinates for the drag operation. The input locus linking the starting position and the end position when the user performs a drag operation constitutes a line segment input by the user.

As shown in FIG. 3, control buttons (also referred to as button objects, command buttons, or predetermined areas) B are displayed by the display control unit 34 on part of the display unit 12, which includes the touch panel 15 on the entire surface thereof. Then, the regions corresponding to the individual control buttons B are set by the control unit 38 so as to be associated with predetermined commands. In the present embodiment, a mark setting button B1, which is associated with a mark object creating command, a destination setting button B2, which is associated with a destination object creating command, an intermediate point setting button B3 which is associated with an intermediate point object creating command, an erase button B4, which is associated with an object erase command, and an information display button B5, which is associated with an object information output command, are displayed on the display unit 12 as the control buttons B. Furthermore, it is possible for the display buttons B displayed on the display unit 12 to change according to menu selections, etc.

The control block 16 is provided with the object control unit 39, which receives the output from the input control unit 38, detects commands to create objects (marks), erase objects, and so forth, and executes processing in response to those commands. The configuration of the object control unit 39 is shown in FIG. 2. The object control unit 39 is provided with a command detection unit 40, an object creation unit (mark creating processor) 41, an object erasing unit (mark erasing processor) 42, and an object information control unit (mark information output processor) 43. The departure point, the destination, the intermediate point, marks, and so on are visually displayed as objects, that is to say, as so-called icons or marks.

The command detection unit 40 determines whether or not the user has selected a region corresponding to a control button B on the basis of the touch-position coordinates x and y input from the input control unit 38. Then, if the command detection unit 40 determines that the user has selected a region corresponding a control button B, the command associated with that control button B is detected and this command is output to the object creation unit 41, the object erasing unit 42, or the object information control unit 43.

Figure 3A:
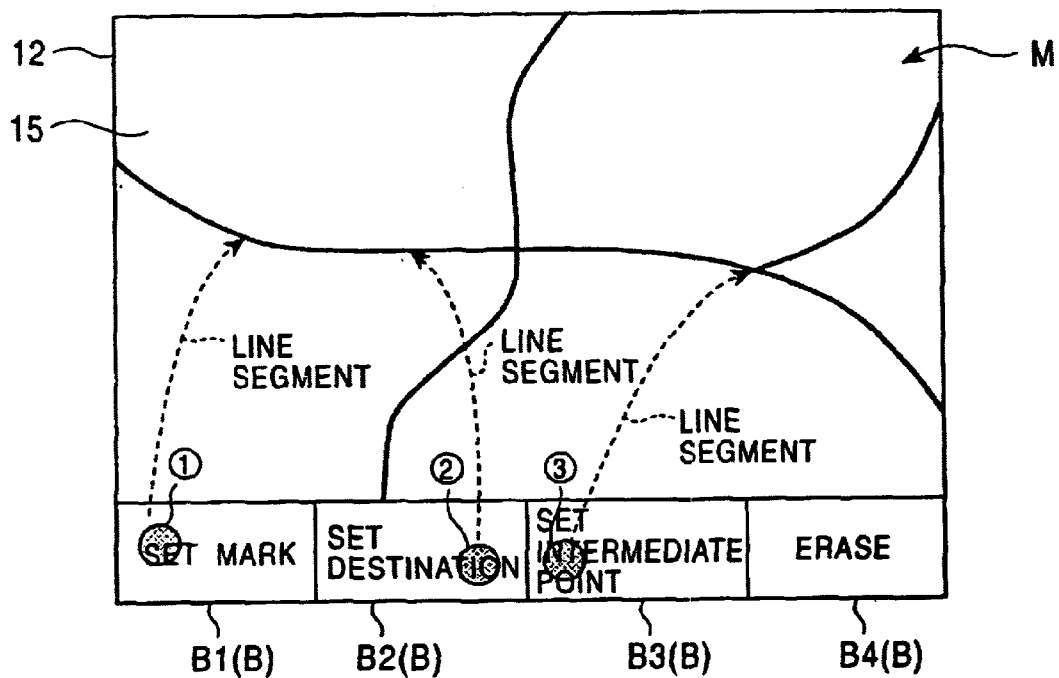
FIGS. 3A and 3B show drag operations being performed from control buttons to points on a map, and the subsequent creation of objects at the desired points.
Figure 3B:
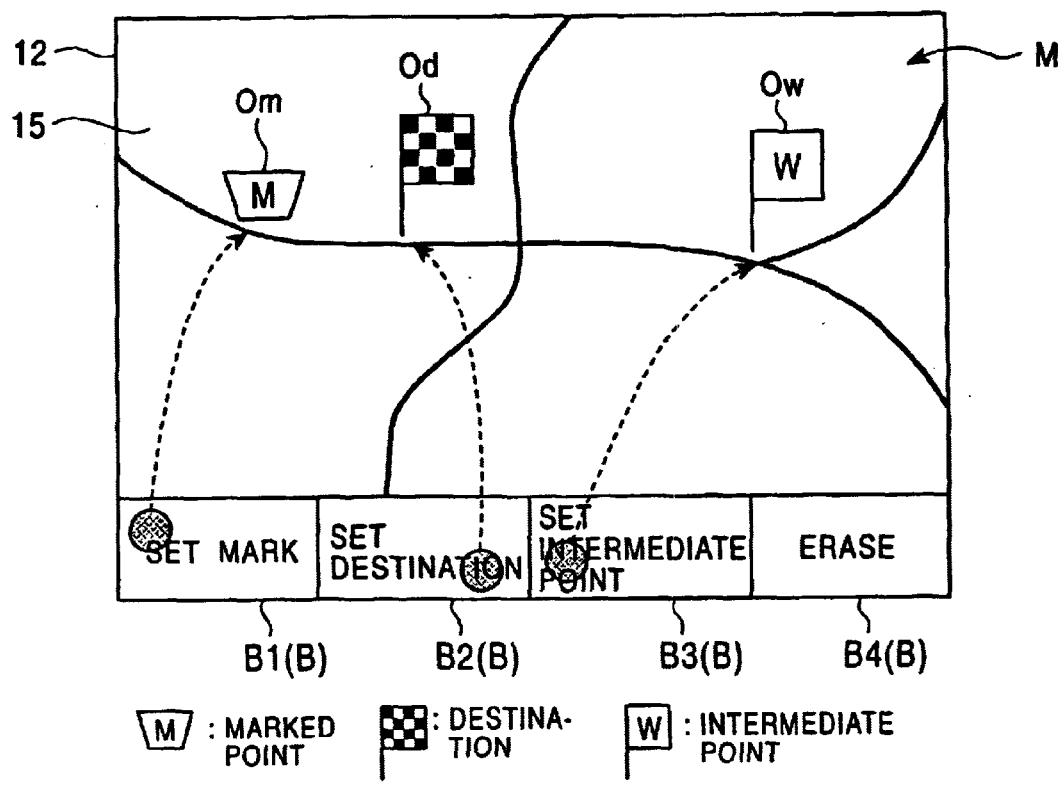

When the object creation unit 41 receives an object creation command as the command from the command detection unit 40, it creates an object O and displays it on the display unit 12. For example, as shown in FIG. 3A, in the case where the user performs a drag operation between the mark setting button B1 and a point on the map M (refer to ① in FIG. 3A), the object creation unit 41, upon receiving a command from the command detection unit 40, creates a mark object Om, as the object O, at either the starting point or the ending point of the drag operation (see FIG. 3B). In the same way, in the case where the user performs a drag operation between the destination setting button B2 and a point on the map M (refer to ② in FIG. 3A), the object creation unit 41, upon receiving a command from the command detection unit 40, creates a destination object Od, as the object O, at either the starting point or the ending point of the drag operation (see FIG. 3B). In the case where the user performs a drag operation between the intermediate-point setting button B3 and a point on the map M (refer to ③ in FIG. 3A), the object creation unit 41, upon receiving a command from the command detection unit 40, creates an intermediate-point object Ow, as the object O, at either the starting point or the ending point of the drag operation (see FIG. 3B).

When the user selects the destination setting button B2 and the destination object Od is created by the object creation unit 41, the position at which the destination object Od is created is set as the destination on the route set by the route setting control unit 37. In the same way, when the user selects the intermediate-point setting button B3 and the intermediate-point object Ow is created by the object creation unit 41, the position at which the intermediate-point object Ow is created is set as an intermediate point on the route set by the route setting control unit 37.

Figure 4A:
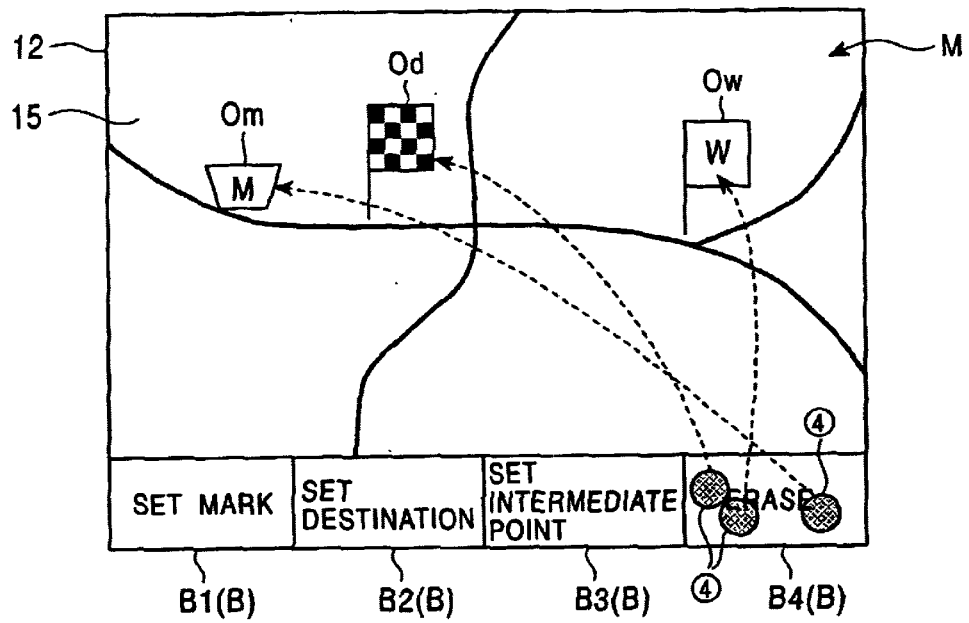
FIGS. 4A and 4B show drag operations being performed from an erase button to points on the map, and subsequent erasure of objects displayed on the map.
Figure 4B:
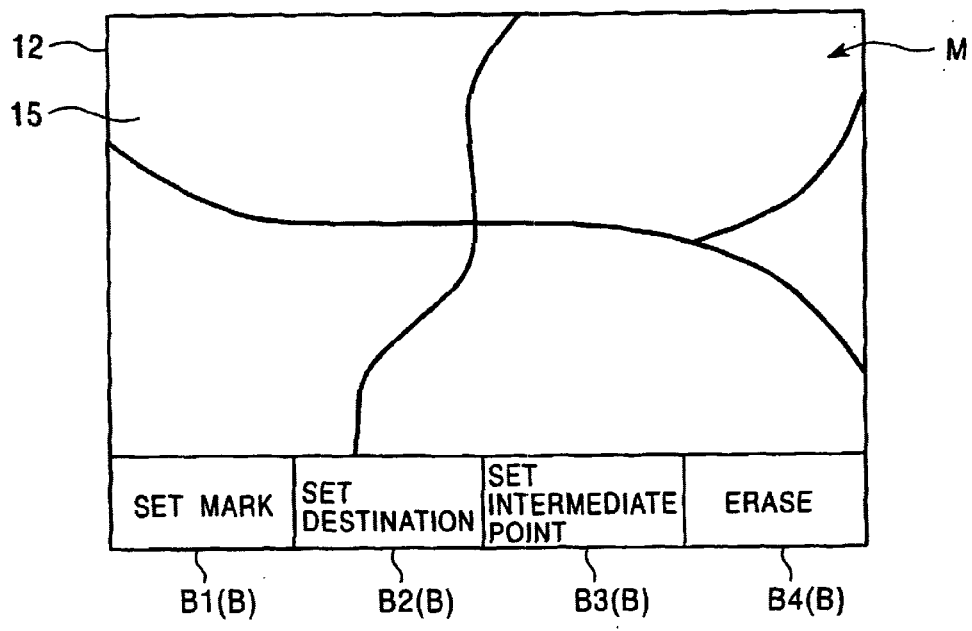

When the object erasing unit 42 receives an object erase command as the command from the command detection unit 40, the object O that is displayed at either the starting point or the ending point of the drag operation is erased. For example, as shown in FIG. 4A, in the case where the user performs a drag operation between the erase button B4 and a point on the map M (refer to (4) in FIG. 4A), the object erasing unit 42, upon receiving a command from the command detection unit 40, erases the object O that is displayed either at the starting point or the ending point of the drag operation (refer to FIG. 4B).

Figure 5A:
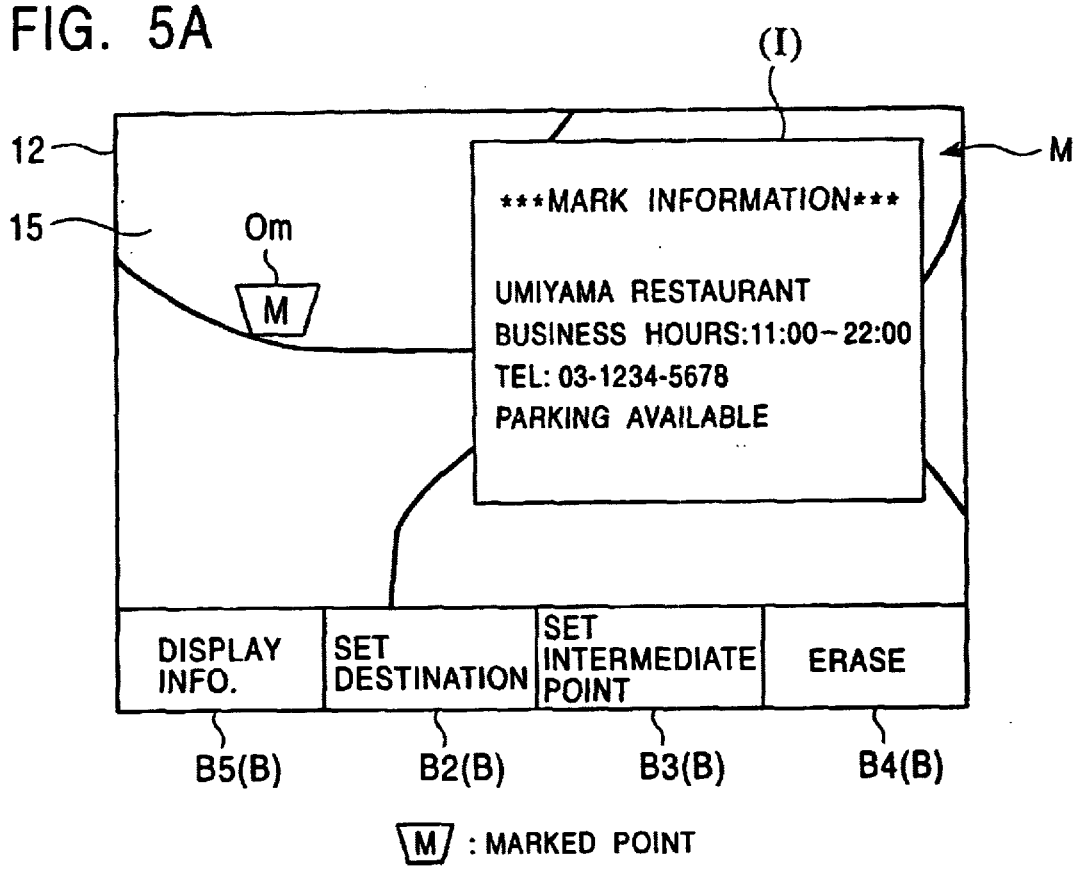
FIGS. 5A and 5B show a drag operation being performed from an information display button to an object on the map, and the subsequent creation of object information for that object.
Figure 5B:
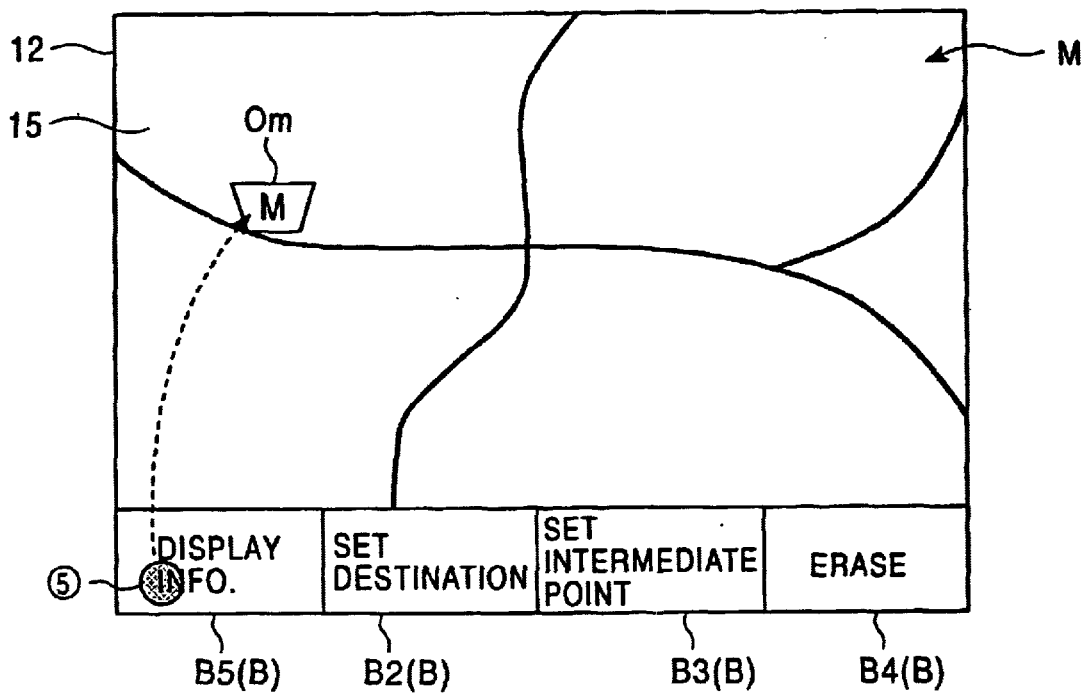

When the object information control unit 43 receives an object information creation command as the command from the command detection unit 40, it creates object information (mark-related information) I, such as that shown in FIG. 5A, and displays it on the display unit 12. As the information for creating the object information I, a variety of types of information (for example, the telephone number of a facility or store, a photograph, guide information, etc.) related to the point on the map to which an object (mark) is attached is stored in an object information storage unit such as, for example, a recorded disk or a non-volatile memory. For example, as shown in FIG. 5B, when the user performs a drag operation between the information display button B5 and a the mark object Om, the object information control unit 43, upon receiving a command from the command detection unit 40, reads out from the object information storage unit the information stored therein that is associated with the mark object Om, creates object information I, and displays the object information I. In the case where the object O is a mark object Om, as shown, for example, in FIGS. 5A and 5B, and when the point to which that mark is attached is a restaurant, the object information I shows the business hours of that restaurant, whether or not there are parking spaces, the days on which the restaurant is closed, whether or not it is possible to pay with a credit card, and so forth. In the case where object information I is created for the destination object Od, it is possible to include information such as the total distance from the present location to the destination and the estimated time required as the object information I.

Moreover, concerning the destination object Od, the intermediate-point object Ow, etc., the object information control unit 43 can read out from the object information storage unit the information stored therein that is associated with these objects.

Next, a description will be given of the processing performed when the user performs an operation on the touch panel 15 in the navigation device having the above-described configuration. In the present invention, the term "pen-down" refers to a finger being placed on the touch panel 15. Likewise, the term "pen-move" refers to the action of moving the finger while keeping the finger in contact with the touch panel 15, thus causing the contact position between the finger and the touch panel 15 to move. Furthermore, the term "pen-up" refers to the action of separating the finger, which was placed in contact with the touch panel 15, from the touch panel 15. The action of sequentially performing a pen-down, a pen-move, and a pen-up operation is called a drag operation.

Figure 6:
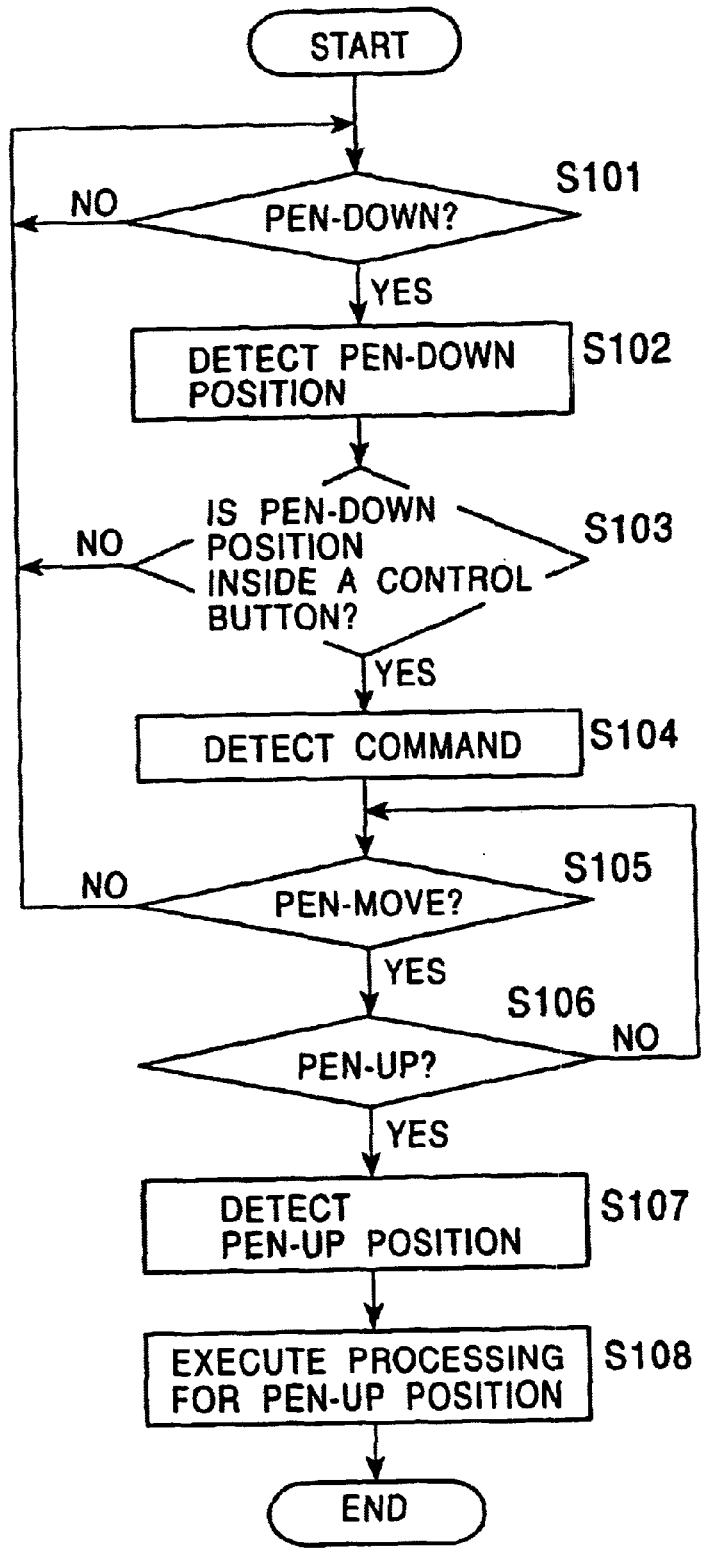
FIG. 6 shows a flowchart of the processing performed when a drag operation is performed from a control button to a point on the map and processing for that point on the map is executed.

First, the case in which a drag operation is performed from a control button B to a point on the map M will be explained with reference to FIG. 6.

To start, when the user touches the touch panel 15 with his or her finger, the contact is detected by the touch panel 15, which determines that a pen-down operation occurs (step S101). Then, the input control unit 38 detects the position where the finger touches, in other words, the position coordinates (x1, y1) of the pen-down position, and outputs this coordinate data to the command detection unit 40 (step S102). On the other hand, if it is determined that no pen-down operation has occurred, the process returns to step S101.

In step S103, the command detection unit 40 determines whether or not the pen-down position is inside a control button B. If it is determined that the pen-down operation occurred outside the area of the control buttons B (B1 to B5), the process returns to step S101.

Figure 7:
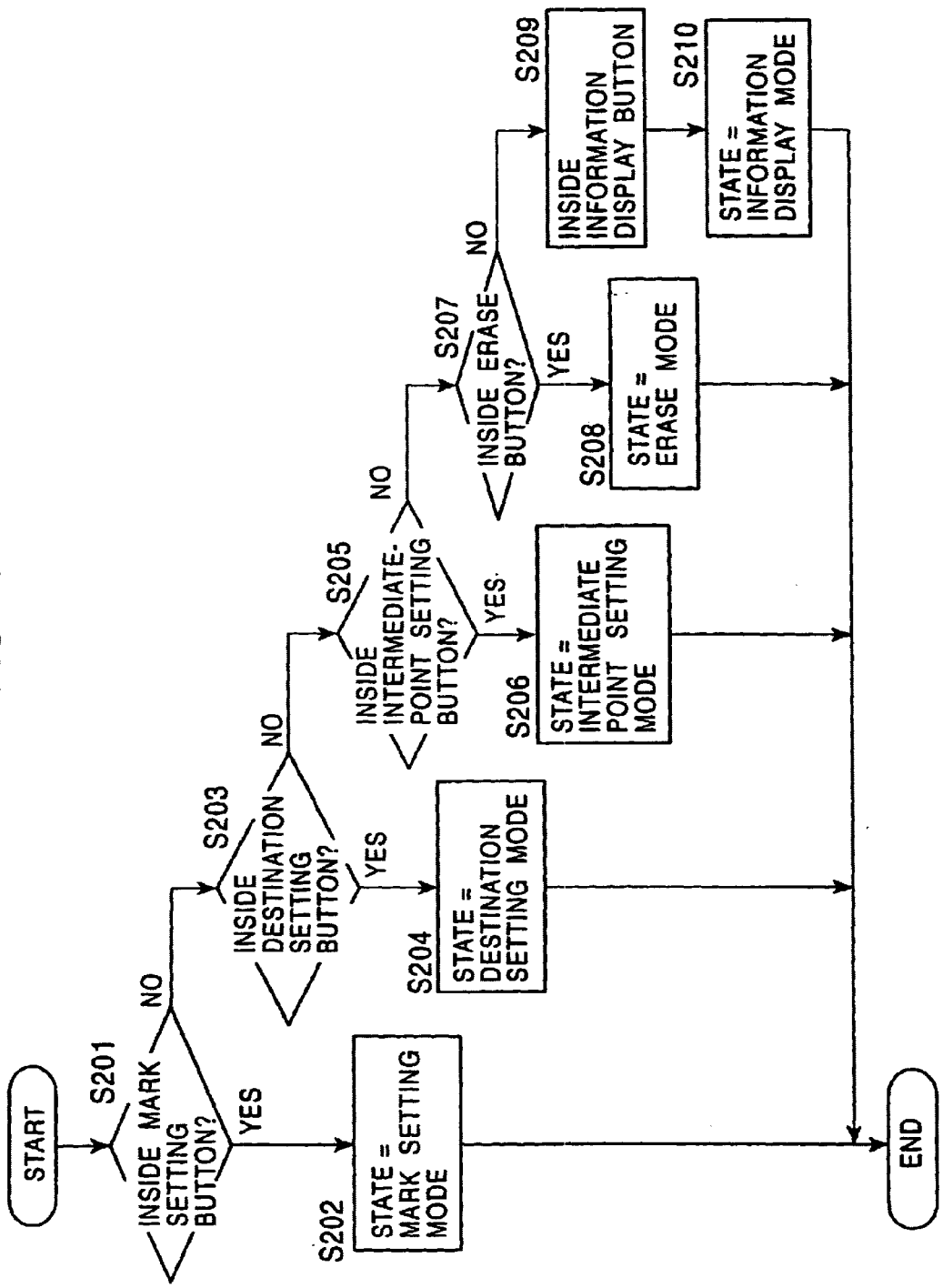
FIG. 7 shows a flowchart of the processing performed in step S104.

As shown in FIGS. 3A, 4A, 5A, and 5B, when the pen-down position is inside one of the buttons B (B1 to B5), the process proceeds to step S104. In step S104, based on the coordinates (x1, y1) of the pen-down position, the command detection unit 40 detects the command associated with the control button B where the user performed the pen-down operation. The actual processing which is performed in step S104 is shown in FIG. 7.

In step 201, it determined whether or not the position at which the user performed a pen-down operation is inside the mark setting button B1.

As shown by ① in FIG. 3A, when the user performs a pen-down operation inside the mark setting button B1, the process proceeds to step S202, where the command detection unit 40 sets the status to mark setting mode.

When it is determined in step S201 that the position at which the user performed the pen-down operation is outside the button B1, the process proceeds to step S203. In step S203, it is determined whether or not the position at which the user performed the pen-down operation is inside the destination setting button B2.

As shown by ② in FIG. 3A, when the user performs the pen-down operation inside the destination setting button B2, the process proceeds to step S204, where the command detection unit 40 sets the status to destination setting mode.

When it is determined in step S203 that the position at which the user performed the pen-down operation is outside the destination setting button B2, the process proceeds to step S205. In step S205, it is determined whether or not the position at which the user performed the pen-down operation is inside the intermediate-point setting button B3. As shown by ③ in FIG. 3A, when the user performs the pen-down operation inside the intermediate-point setting button B3, the process proceeds to step S206, and where the command detection unit 40 sets the status to intermediate-point setting mode.

When it is determined in step S205 that the position at which the user performs the pen-down operation is outside the intermediate-point setting button B3, the process proceeds to step S207. In step S207, it is determined whether or not the position at which the user performs the pen-down operation is inside the erase button B4. That is, as shown by ④ in FIG. 4A, when the user performs the pen-down operation inside the erase button B4, the process proceeds to step S208, where the command detection unit 49 sets the status to erase mode.

When it is determined in step S207 that the position at which the user performed the pen-down operation is outside the erase button B4, the process proceeds to step S209. Since, in the present embodiment, the control buttons B are the five buttons B1 to B5, and due to the fact that it has already been determined in step S103 that the pen-down position is inside the control buttons B, in step S209 it is assumed that the user must have performed the pen-down operation inside the information display button B5 (see ⑤ in FIG. 5B). In the following step S210, the command detection unit 40 sets the status to information display mode.

Thus, the actual processing performed in step S104, is shown in FIG. 7. After step S104, where the command detection unit 40 detects the command associated with the control button B where the user performed the pen-down operation and sets the status to a predetermined mode, the process proceeds to step S105.

In step S105, the input control unit 38 determines whether or not a pen-move operation occurs. In other words, the input control unit determines whether or not the user touches a control button B with his or her finger and then moves his or her finger on the touch panel 15. If it is determined that no pen-move operation occurs, the process goes back to step S101.

As shown by the line segment (dotted line) in FIG. 3A, when the user moves his or her finger on the touch panel 15, it is determined that a pen-move operation occurs, and the process proceeds to step S106. When performing a pen-move operation, in the case where the status is set to, for example, the destination setting mode, an object corresponding to this status, in other words a destination object Od, can be drawn on the display screen 12 along the path traced by the moving finger.

In step S106, it is determined whether or not the finger is removed from the touch panel 15, that is to say, whether or not a pen-up operation occurs. If the pen-move operation is still being carried out, the process returns to step S105 and repeats this determination.

As shown in FIG. 3A, the point in time when the user removes his or her finger from the touch panel 15 after performing a drag operation is detected in the touch panel 15, and thus it is determined in step S106 that a pen-up operation occurs. After it is determined in step S106 that a pen-up operation has occurred, the process proceeds to step S107. In FIG. 3A, the track traced by the drag operation performed by the user is indicated by a line segment. The ending position of this line segment (the ending point of the arrow indicated by the dotted broken in FIG. 3A) is determined as the pen-up position. In step S107, the input control unit 38 detects the position coordinates (x2, y2) of the pen-up position and outputs this coordinate data to the object control unit 39. The process then proceeds to step S108.

Figure 8:
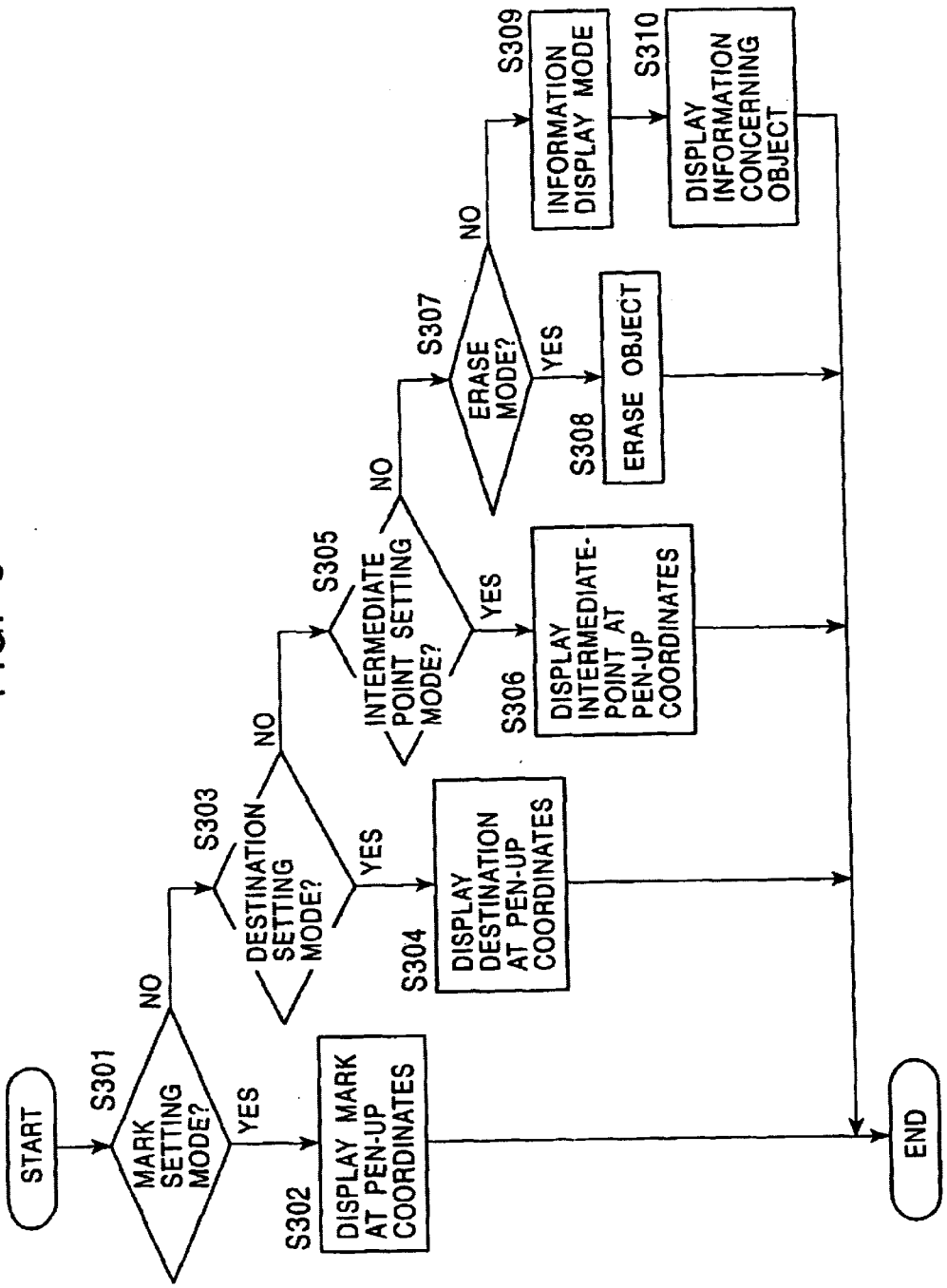
FIG. 8 shows a flowchart of the processing performed in step S108.

In step S108, after receiving the output from the input control unit 38 and determining the status detected in step S104, the object control unit 39 executes processing for the pen-up position according to the status. The actual processing performed in step S108 is shown in FIG. 8.

First, in step S301, the object control unit 39 determines whether or not the status is set to mark setting mode. That is, as shown by ① in FIG. 3A, when it is determined that the user performed the pen-down operation inside the mark setting button B1, thus setting the status to the mark setting mode, the process proceeds to step S302. In step S302, the object creation unit 41 creates a mark object Om and displays it on the display unit 12 at the pen-up coordinates detected in step S107 (see FIG. 3B).

When the object control unit 39 determines in step S301 that the status is not set to mark setting mode, the process proceeds to step S303. In step S303, the object control unit 39 determines whether or not the status is set to destination setting mode. That is, as shown by ② in FIG. 3A, when it is determined that the user performed the pen-down operation inside the destination setting button B3, thus setting the status to destination setting mode, the process proceeds to step S304. In step S304, the object creation unit 41 creates a destination object Od and displays it on the display unit 12 at the pen-up coordinates detected in step S107 (refer to FIG. 3B).

When the object control unit 39 determines in step S303 that the status is not set to destination setting mode, the process proceeds to step S305. In step S305, the object control unit 39 determines whether or not the status is set to intermediate-point setting mode. That is, as shown by ③ in FIG. 3A, when it is determined that the user performed the pen-down operation inside the intermediate-point setting button B3, thus setting the status to intermediate-point setting mode, the process proceeds to step S306. In step S306, the object creation unit 41 creates an intermediate-point object Ow and displays it on the display unit 12 at the pen-up coordinates detected in step S107 (refer to FIG. 3B).

When the object control unit 39 determines in step S305 that the status is not set to intermediate-point setting mode, the process proceeds to step S307. In step S307, the object control unit 39 determines whether or not the status is set to erase mode. That is, as shown by ④ in FIG. 4A, when it is determined that the user performed the pen-down operation inside the erase button B4, thus setting the status to erase mode, the process proceeds to step S308. In step S308, when an object O exists at the pen-up coordinates detected in step S107, the object erasing unit 42 erases the object O at the pen-up coordinates. In other words, as shown in FIG. 4A, if a mark object Om is at the pen-up coordinates, the object erasing unit 42 erases that mark object Om (refer to FIG. 4B). In the same way, if an intermediate-point object Ow is at the pen-up coordinates, the object erasing unit 42 erases that intermediate-point object Ow, and if a destination object Od is at the pen-up coordinates, the object erasing unit 42 erases that destination object Od (refer to FIG. 4B).

In the case where the object control unit 39 determines that the status is not set to erase mode in step S307, the status is set to the information display mode (S309). In step S309, the object information control unit 42 reads out from an object information storage unit (not shown in the drawing) the information stored therein that is related to the object O at the pen-up coordinates, and outputs it onto the display unit 12 as object information I. That is, as shown in FIG. 5B, in the case where the object O at the pen-up coordinates is a mark object Om, the object information control unit 43 reads out from the object information storage unit the information stored therein that is related to this mark, and outputs it as the object information I (see FIG. 5A).

Figure 9:
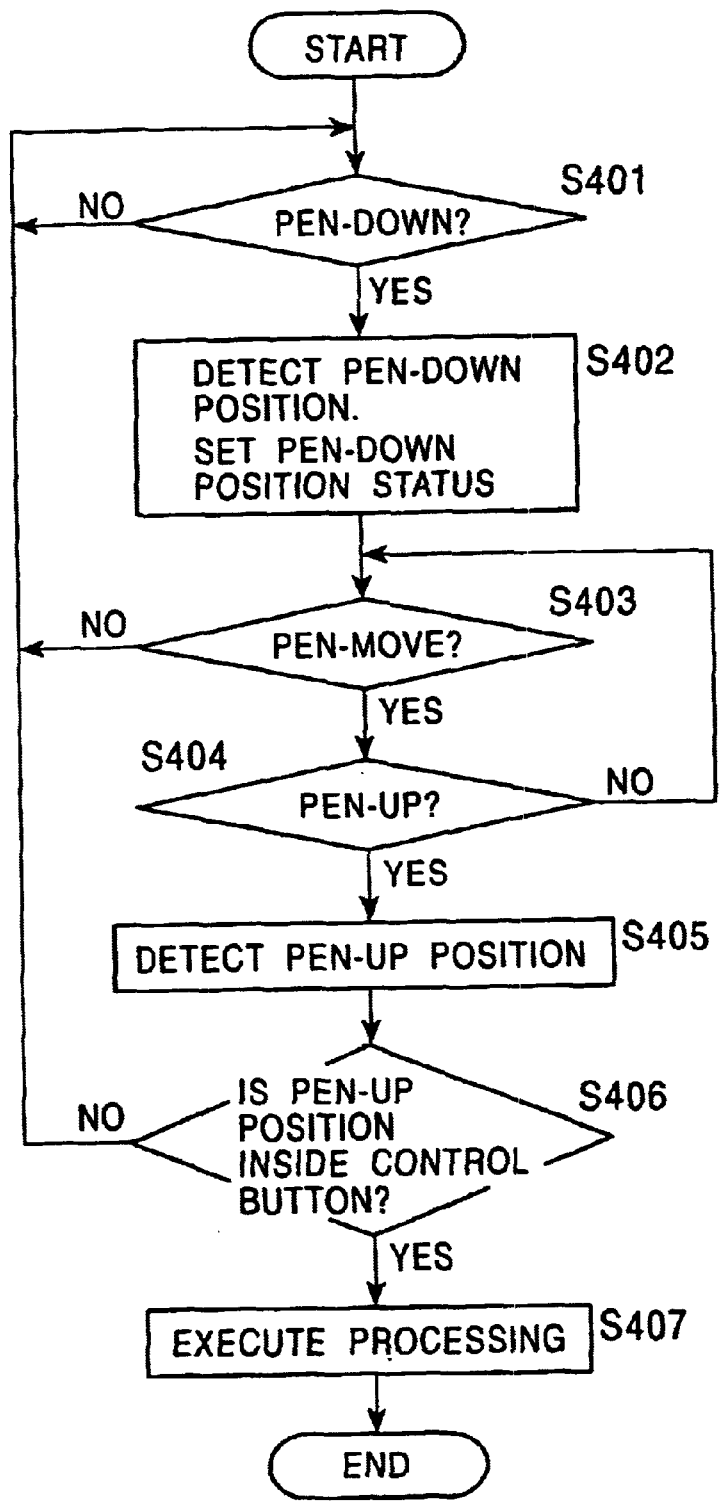
FIG. 9 shows a flowchart of the processing performed when a drag operation is performed from a point on the map to a control button and processing for that point on the map is executed.

Next, the case where a drag operation is performed from a point on the map M towards a control button B is explained with reference to FIG. 9.

First, it is determined in step S401 whether or not a pen-down operation occurs. When the user touches the touch panel 15 with his or her finger, this is detected by the control panel 15, thus determining that a pen-down operation occurs (step S401). If it is determined that a pen-down operation occurs, the input control unit 38 detects the position touched by the finger, in other words, position coordinates (x1, y1) of the pen-down position, and outputs this coordinate data to the command detection unit 40 (step S402). On the other hand, if it determined that no pen-down operation has occurred, the process returns to step 401.

Figure 10:
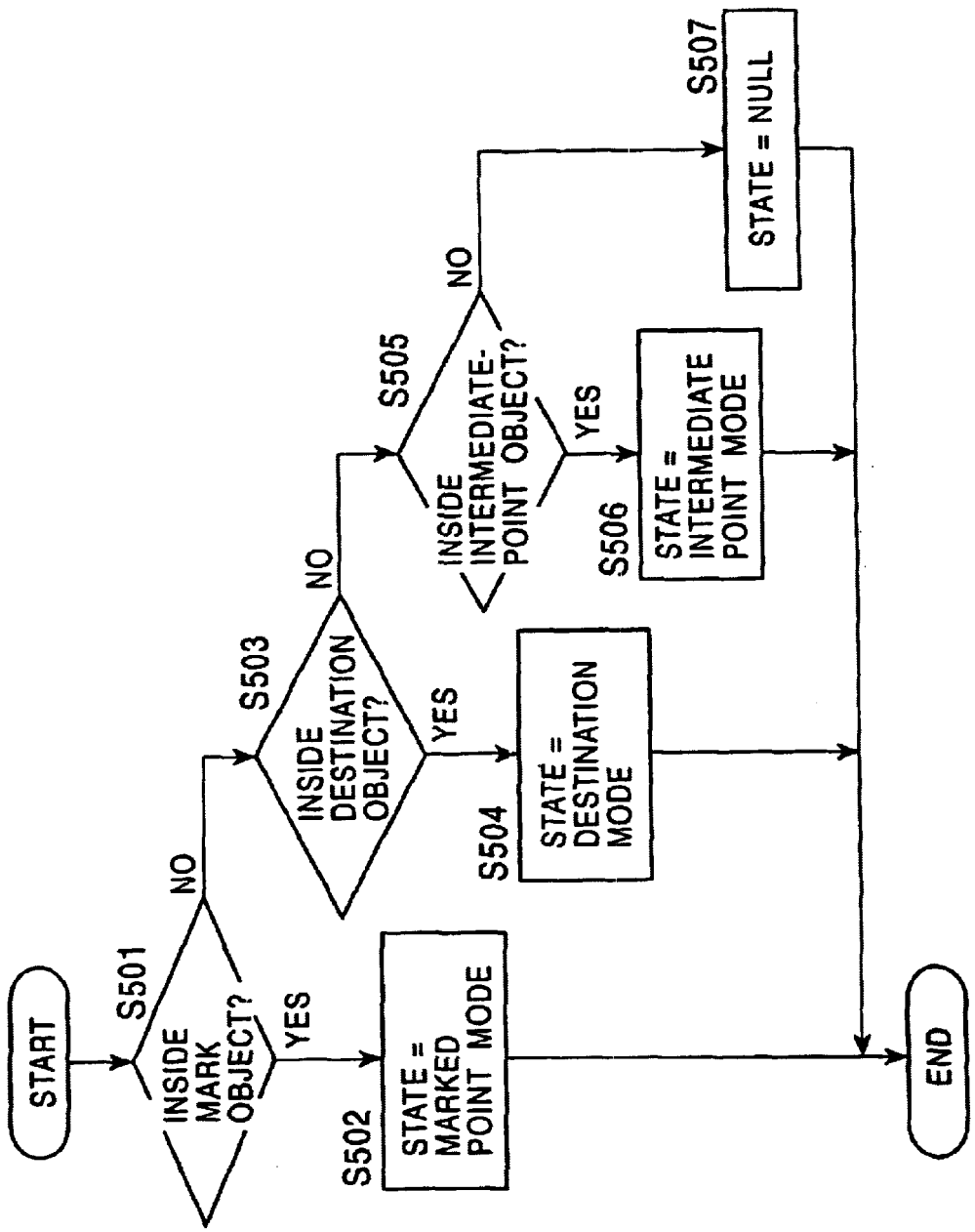
FIG. 10 shows a flowchart of the processing performed for status setting in step S402.

In step S402, it is determined whether or not an object O was previously created at the position where the user performed the pen-down operation, and the status for the pen-down position is set. The actual processing performed in step S402 is shown in FIG. 10.

In step S501, it is determined whether or not the position at which the user performed the pen-down operation is inside a mark object Om. That is, as shown by ⑥ in FIG. 12A, when the user performs the pen-down operation inside the mark object Om, the process proceeds to step S502, where the command detection unit 40 sets the status to marked point mode.

When it is determined in step S501 that the position at which the user performed the pen-down operation is outside the mark object Om, the process proceeds to step S503. In step S503, it is determined whether or not the position at which the user performed the pen-down operation is inside a destination object Od.

Figure 12A:
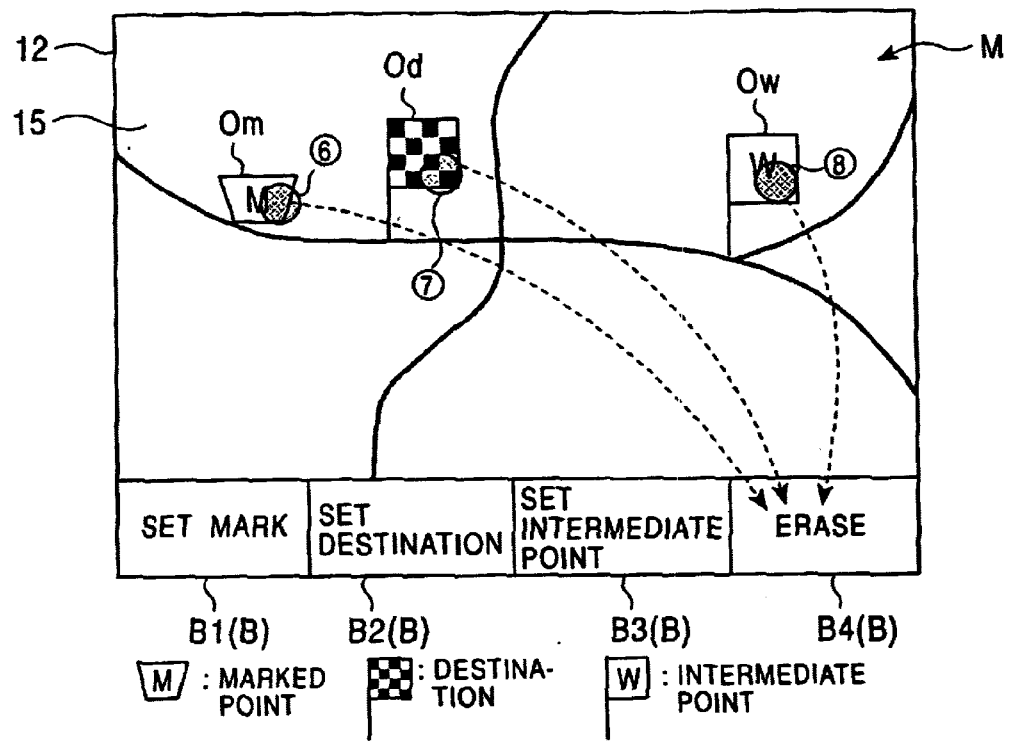
FIGS. 12A and 12B show drag operations being performed from points on the map to an erase button, and the subsequent erasure of objects displayed on the map.

As shown by ⑦ in FIG. 12A, when the user performed the pen-down operation inside the destination object Od, the process proceeds to step S504, where the command detection unit 40 sets the status to destination point mode.

When is determined in step S503 that the position at which the user performed the pen-down operation is outside the destination object Od, the process proceeds to step S505. In step S505, it is determined whether or not the position at which the user performed the pen-down operation is inside an intermediate-point object Ow. As shown by ⑧ in FIG. 12A, when the user performed the pen-down operation inside the intermediate-point object Ow, the process proceeds to step S506, where the command detection unit 40 sets the status to intermediate-point mode.

Figure 13A:
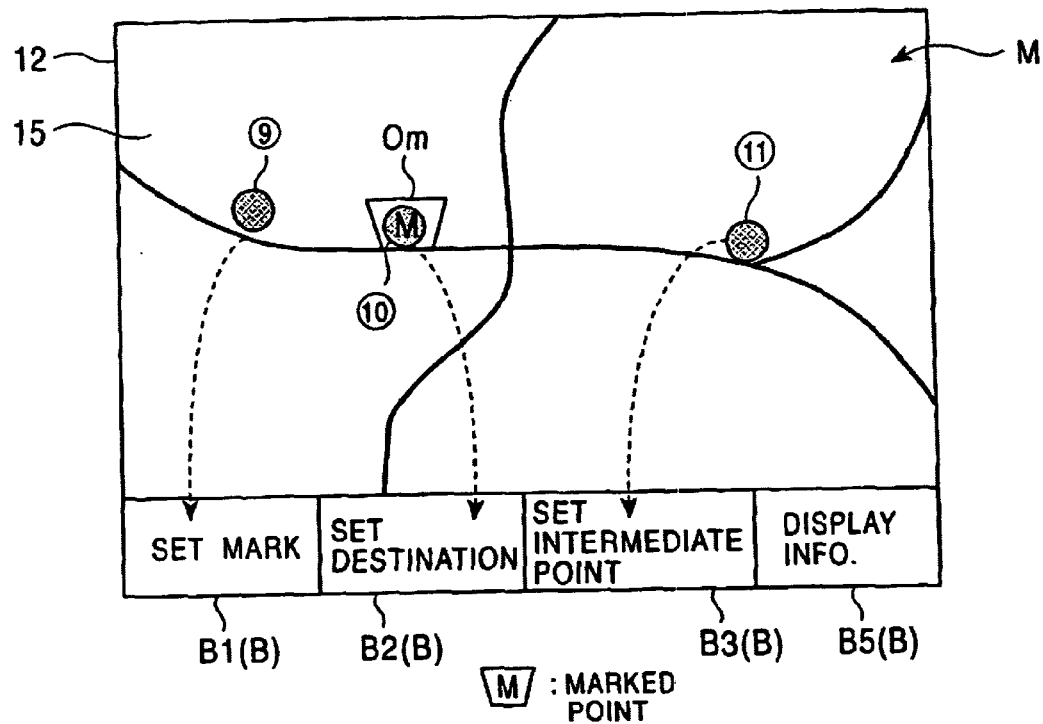
FIGS. 13A and 13B show drag operations being performed from points on the map to control buttons, and the subsequent creation of objects at the desired points.

As shown by ⑨ in FIG. 13A, when the user performed the pen-down operation at a point where no object O is set, steps S501, S503, and S505 all result in NO, and the process proceeds to step S507, where the command detection unit 40 sets the status to null.

After executing this processing in step S402, the process proceeds to step S403.

In step S403, the input control unit 38 determines whether or nor a pen-move operation occurs. If it is determined that there is no pen-move operation, the process returns to step S401.

As shown by the line segment (dotted line) in FIG. 12A, when the user moves his or her finger on the touch panel 15, it is determined that a pen-move operation occurs, and the process proceeds to step S404.

In step S404 it is determined whether or not the user removes his or her finger from the touch panel 15, that is, whether or not a pen-up operation occurs. If this occurs while a pen-move operation is still being carried out, the process returns to step S403 and repeats this determination. As shown by the line segment in FIG. 12A, the touch panel 15 detects when the user performs a drag operation and then removes his or her finger from the touch panel 15, thus determining in step S404 that a pen-up operation occurs. The input control unit 38 detects the position coordinates (x2, y2) of the pen-up position (step S405), this coordinate data is output to the object control unit 39, and then the process proceeds to step S406.

In step S406, the command detection unit 40 determines whether or not the pen-up position is inside a control button B. In the case where it is determined that the pen-up operation occurs outside the region of the control buttons B (B1 to B5), the process returns to step S401.

As shown in FIG. 12A and FIG. 13A, when the pen-up position is inside any one of the control buttons B (B1 to B5), the process proceeds to step S407. In step S407, based on the pen-up coordinates (x2, y2), the processing associated with the control button B where the pen-up operation occurred is executed.

Figure 11:
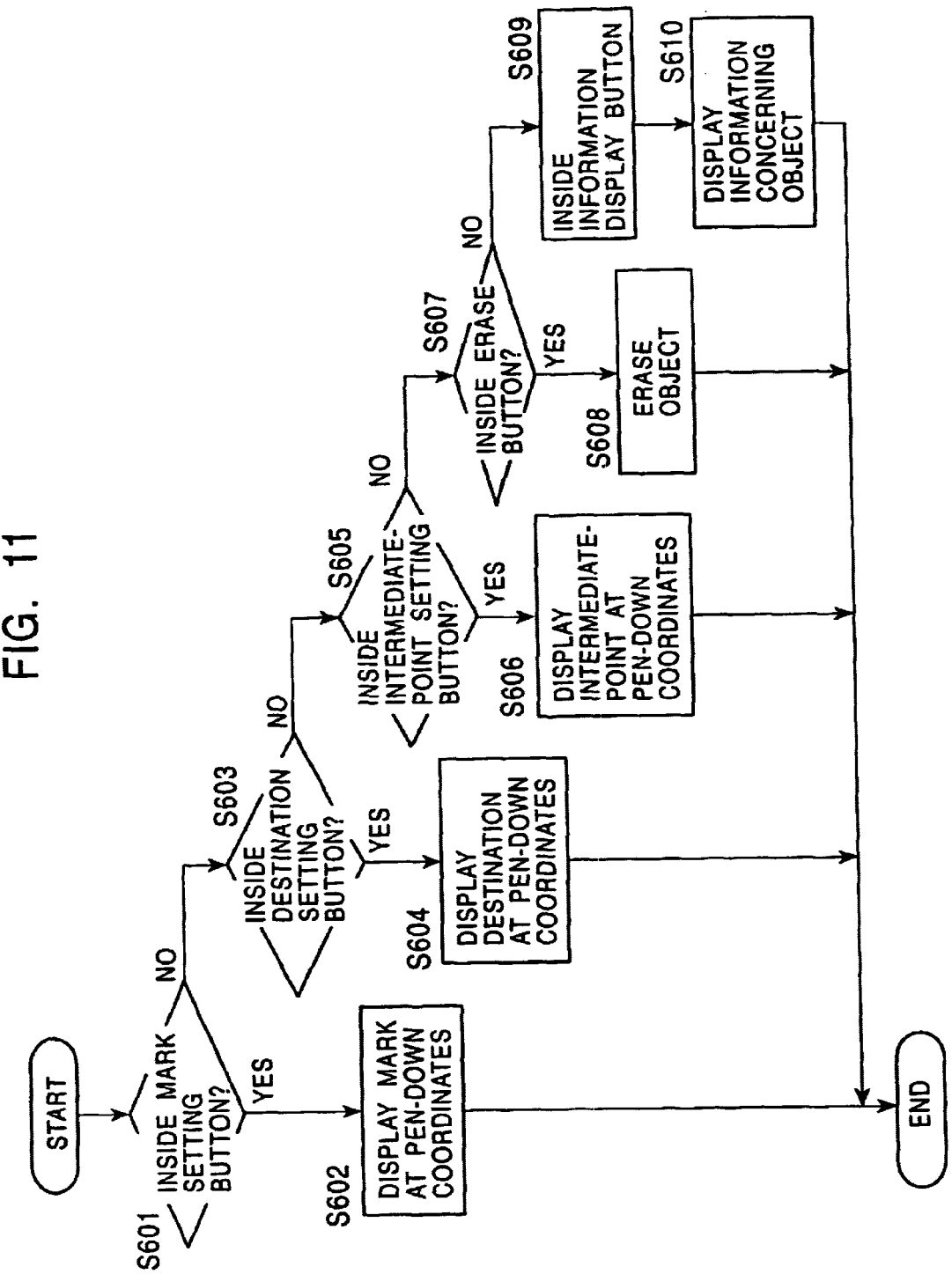
FIG. 11 shows a flowchart of the processing performed in step S407.

The actual processing performed in step S407 is shown in FIG. 11.

Figure 13B:
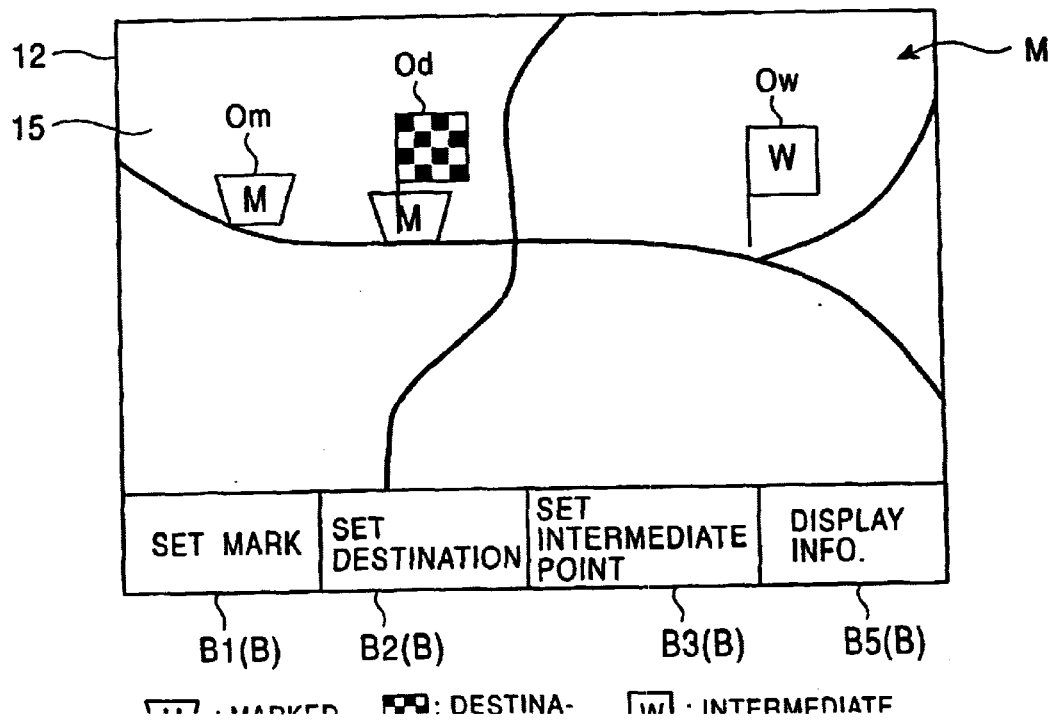
Figure 14A:
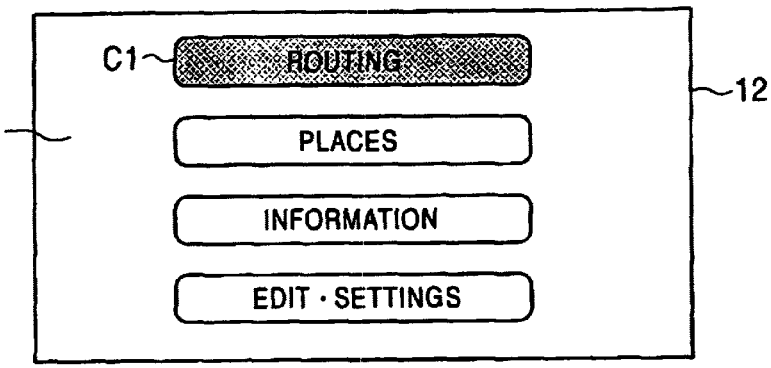
FIGS. 14A to 14C show destination setting using a remote controller.
Figure 14B:
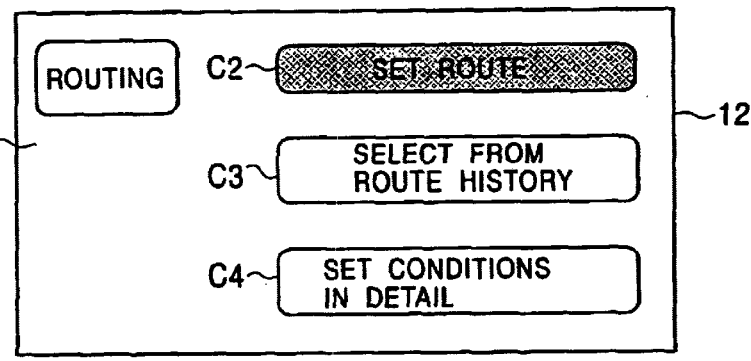
Figure 14C:
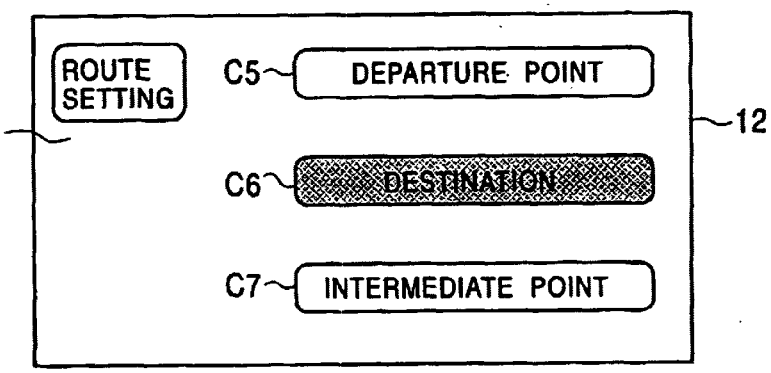
Figure 15:
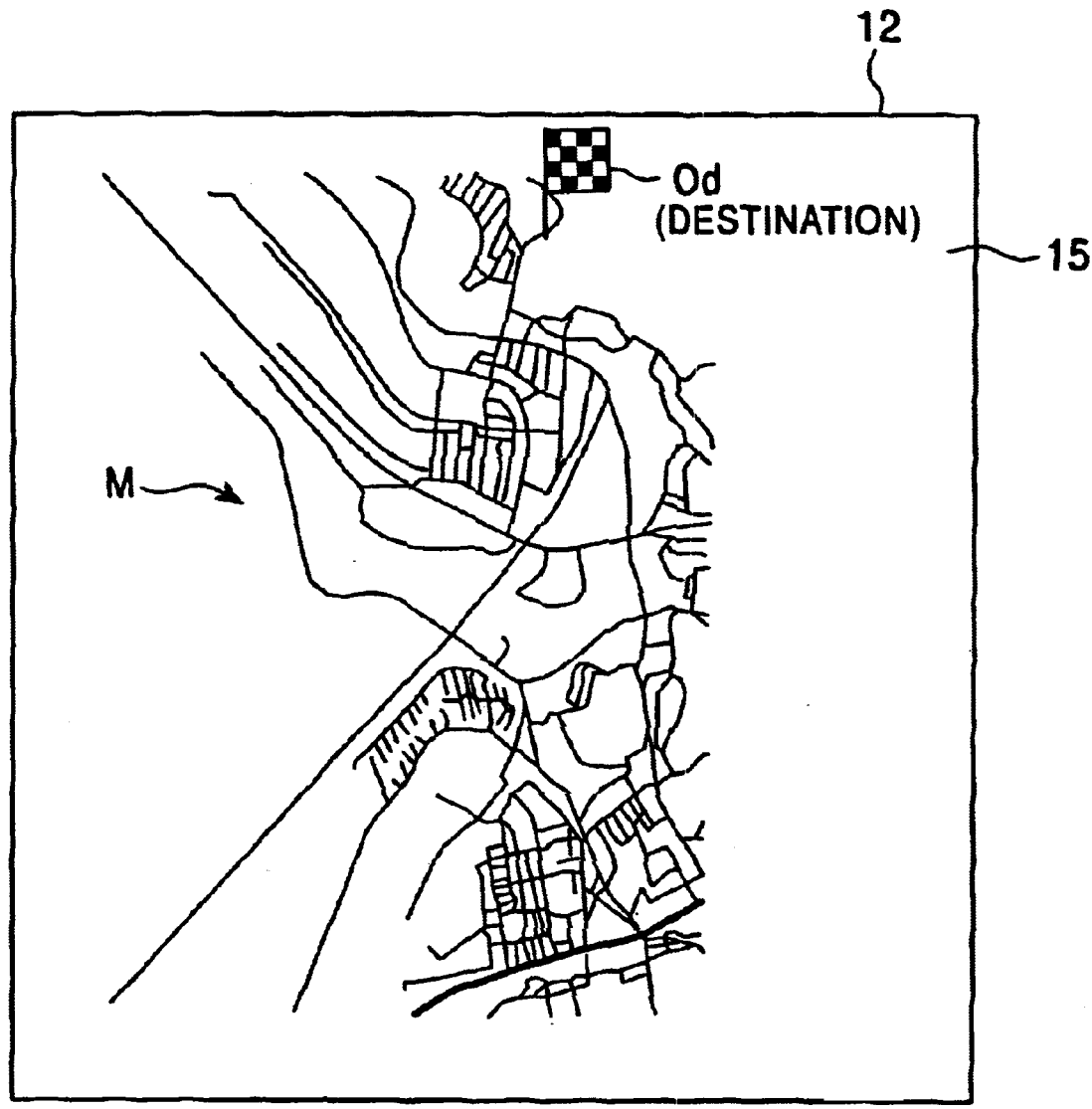
FIG. 15 shows the creation of a destination object at a point on the map.
Figure 16A:
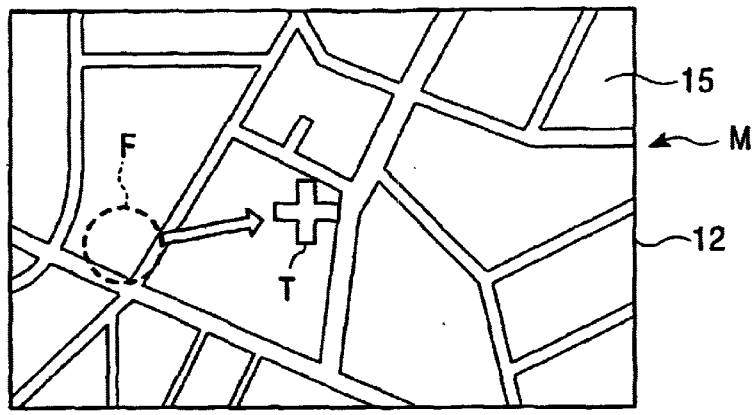
FIGS. 16A to 16C show the creation of a destination object on the map while the map is being scrolled.
Figure 16B:
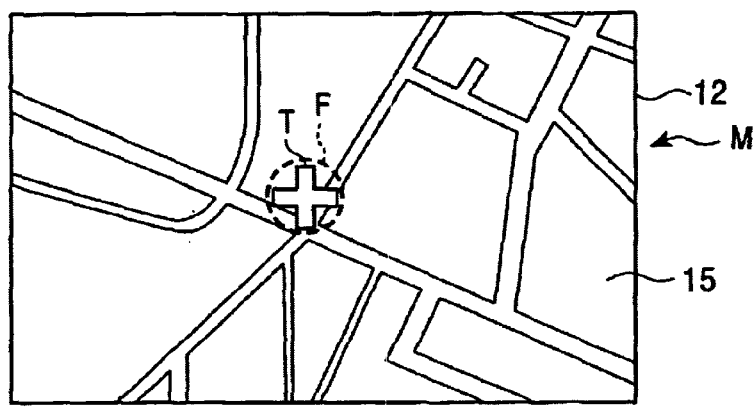
Figure 16C:
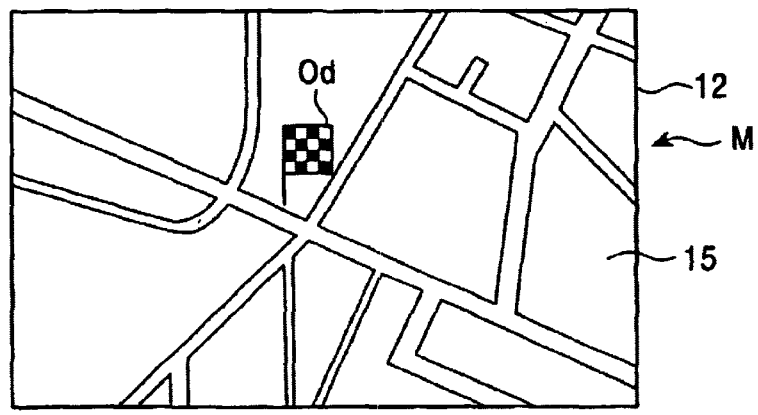

First, in step S601, the object control unit 39 determines whether or not the pen-up position coordinates are inside the mark setting button B1. As shown in FIG. 13A, when the user performs the pen-up operation inside the mark setting button B1, the process proceeds to step S602. In step S602, the status set in step S402 is referred to, and the corresponding processing is executed. If the status set in step S402 is any status other than mark point mode, the object creation unit 41 creates a mark object Om at the pen-down coordinates. In other words, when the status is set to null, destination mode, or intermediate-point mode, a mark object Om is created at each of the pen-down coordinates. The mark object Om created by the object creation unit 41 is displayed on the display unit 12 (refer to FIG. 13B). When the status is set to mark point mode, since a mark is already set at this point, no processing is performed. Alternatively, when the status is set to mark point mode and the user performs a pen-up operation inside the mark setting button B1, the mark object Om set at the pen-down coordinates can be removed.

When it is determined in step S601 that it the pen-up position coordinates are not inside the mark setting button B1, the process proceeds to step S603. In step S603, the object control unit 39 determines whether or not the pen-up position coordinates are inside the destination setting button B2. As shown by ⑩ in FIG. 13A, when the user performs the pen-up operation inside the destination setting button B2, the process proceeds to step S604. In step S604, when the status set in step S402 is null, the object creation unit 41 creates a destination object Od at the pen-down coordinates. On the other hand, when the status set in step S402 is the mark point mode, the object creation unit 41 creates a destination object Od and displays it on the display unit 12 at the pen-down coordinates where the mark object Om was created (refer to FIG. 13B).

When it is determined in step S603 that the pen-up position coordinates are not inside the destination setting button B2, the process proceeds to step S605. In step S605, the object control unit 39 determines whether or not the pen-up position coordinates are inside the intermediate-point setting button B3.

As shown by the circled reference character 11 in FIG. 13A, when it is determined that the user performs the pen-up operation inside the intermediate-point setting button B3, thus setting the status to intermediate-point setting mode, the process proceeds to step S606. In step S606, when the status set in step S402 is null, the object creation unit 41 creates an intermediate-point object Ow at the pen-down coordinates. On the other hand, when the status set in step S402 is the mark point mode, the object creation unit 41 creates an intermediate-point object Ow and displays it on the display unit 12 at the pen-down coordinates where the mark object Om was created (refer to FIG. 13B).

Figure 12B:
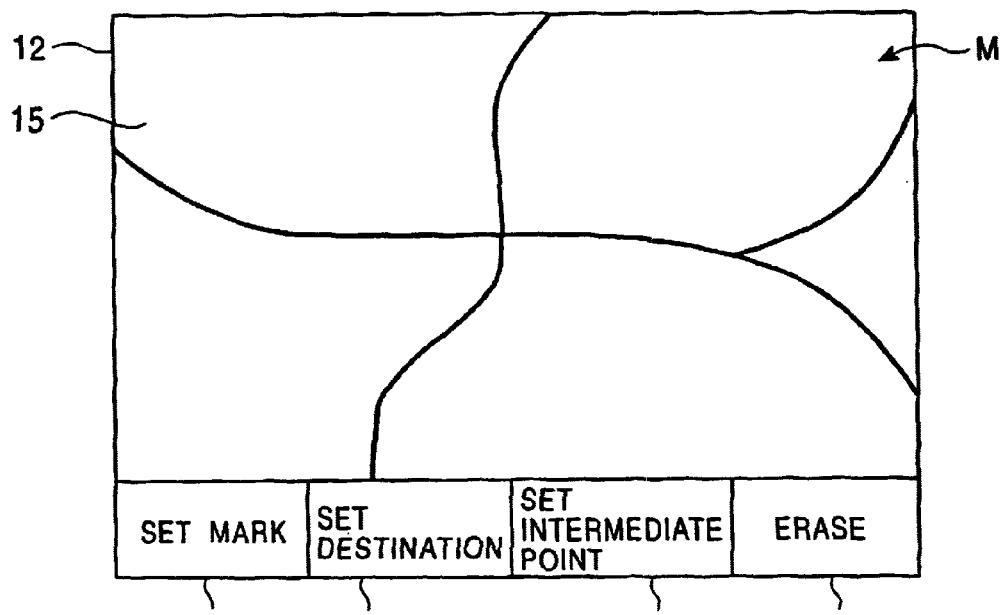

In step S605, when it is determined that the pen-up position coordinates are not inside the intermediate-point setting button B3, the process proceeds to step S607. In step S607, the object control unit 39 determines whether or not the pen-up position coordinates are inside the erase button B4. As shown by ⑥ to ⑧ in FIG. 12A, when it is determined that the user performs the pen-up operation inside the erase button B4, thus setting the status to erase mode, the process proceeds to step S608. In step S608, when there is an object O at the pen-down coordinates, in other words, when the status is set to mark point mode, destination mode, and or intermediate-point mode, the object erasing unit 42 erases the object O at the pen-down coordinates (refer to FIG. 12B).

In step S607, when it is determined that the pen-up position coordinates are not inside the erase button B4, the pen-up position coordinates are defined to be inside the information display button B5 (step S609). In step S609, the object information control unit 43 reads out from the object information storage unit the information stored therein that is related to the object O at the pen-down coordinates, and outputs it as object information I. In other words, when a mark object Om is created at the pen-down coordinates and the status is set to the mark point mode in step S402, the object information control unit 43 reads out from the object information storage unit the information related to the mark object Om, and outputs it as the object information I. In the same manner, when the status is set in step S402 to the destination mode or the intermediate-point mode, the object information control unit 43 reads out from the object information storage unit information stored therein that is related to the destination object Od or information that is related to the intermediate-point object Ow and outputs it onto the display unit 12 as the object information I. On the other hand, when the status is set to null, object information I is output regardless of whether the status is set to information display mode.

As described above, in response to the user performing an operation linking a desired point displayed on the touch panel 15 and a control button B, in other words, a so-called single drag operation (pen-down, pen-move, pen-up), it is possible to perform editing of an object O, that is to say, creation and erasing of the object O and creation of object information I, in a straightforward manner. Accordingly, even when a user operates the navigation device for the first time, it is possible to intuitively perform operations for creating an object O. Furthermore, there is no need for the user to learn the tree-structured menu system, as in conventional devices, nor is there any need for the user to perform a complex operation comprising many steps. Thus, problems such as jumping to a menu screen which the user does not understand as a result of an erroneous operation do not easily occur.

Furthermore, by creating a destination object Od and an intermediate-point object Ow at desired points on the map, it is possible to set these points as the destination and intermediate-point used during route setting. Accordingly, since it is possible to perform route setting with an extremely simple operation, the ease of use is superior.

Moreover, if the operation is performed on the map M which is displayed on the display unit 12, that is inside a display region of the display unit 12, it is possible to perform operations such as creating or erasing an object O at the desired position. Accordingly, when indicating a point on the map M, it is not necessary to scroll the map M, and therefore the ease of use can be drastically improved.

For the sake of convenience, a description has been given of the case where the user performs a drag operation from a control button B towards a point on the map M and then processing is executed for the point on the map M where the drag operation ends and the case where the user performs a drag operation from a point on the map M towards a control button B and then processing is executed for the point on the map M where the drag operation begins. However, it is of course possible to use both methods. For example, it is also possible for the user to perform a drag operation from a desired point on the map M towards the control button B, and thereafter, to perform a drag operation from the control button B towards a desired point on the map M.

Also, in the embodiments described above, by performing a drag operation from a point on the map M towards a control button B or from a control button B towards a point on the map M, it is possible to edit an object O, such as creating or erasing an object O at a point on the map M. However, it is also possible to provide a configuration for performing editing of an object O at a point on the map M by tapping on either a point on the map M or a control button B, which are displayed on the same screen.

The structure described above is applicable not only to car navigation devices, but also to PDAs (Personal Digital Assistants), electronic notebooks, mobile telephones, notebook personal computers, and so forth. In that case, if control buttons B and an image are displayed on the same screen, the image is not necessarily limited to a map. For example, in an electronic notebook, when control buttons having predetermined commands associated therewith are displayed on part of the display unit and an image of a calendar is also displayed on the display unit, by performing a drag operation from a control button B to a date, or alternatively, by performing a drag operation from a date to a control button B, it is possible to execute processing associated with the control button B for either the starting position or the ending position of the drag operation. For example, it is possible to create and display an object O representing, for example, a birthday or a wedding anniversary in a text field for the date at the starting position or the ending position of the drag operation.

Moreover, the program for the processing executed by the object control unit 39 according to the above-described embodiments can be embodied in a recording medium or a program distribution mechanism, as described below.

That is, any type of recording medium that allows the above-described program to be read-out by a computer of the navigation device, such as a hard disk or various types of memory, including a CD-ROM, a DVD, or a semiconductor memory, may be used.

The program delivery mechanism may have a configuration provided with storage means, such as a hard disk or various types of memory, including a CD-ROM, a DVD, or a semiconductor memory, for storing the above-described program, and delivery means which reads out the program from this storage means and delivers the program via a connector or via a network such as the internet or a LAN, to a device which executes the program. This program delivery mechanism should preferably install the program for performing the above-mentioned processing in the navigation device, etc.

In addition to the above configurations, other alternative arrangements of the preferred embodiments given above may be selected and it is possible to modify the structure without deviating from the spirit and scope of the present invention.

According to the present invention described above, editing of an object, etc. can be performed with an intuitive operation.

What is claimed is:

1. A navigation device that executes route guidance based on a position thereof that is measured based on signals transmitted from a plurality of GPS satellites and based on a set route, the navigation device comprising:
   a map data storage unit for storing map data;
   a display unit for displaying a map based on the map data stored in the map data storage unit;
   a touch panel mounted integrally with the display unit and receiving external inputs;
   an object display control unit for displaying a button object having specific processing associated therewith; and
   a mark creation processing unit for creating and displaying a mark on the map at a position corresponding to the specified coordinates, when the button object and desired coordinates on the map are specified by an external input on the touch panel,
   wherein the external input specifies the button object and the desired coordinates on the map, and wherein a drag operation between the button object and the desired coordinates on the map creates or inserts a mark object at either the starting point or the ending point of the drag operation, and
   wherein a user moves a finger or a stylus keeping contact with the touch panel between the button object and the desired coordinates on the map.

2. The navigation device according to claim 1, further comprising:
   a mark erasing unit for erasing the mark when the button object and the coordinates corresponding to the mark displayed on the map are specified by an external input on the touch panel.

3. The navigation device according to claim 1, further comprising:
   a mark-information output processing unit for outputting information related to the mark when the button object and the coordinates corresponding to the mark displayed on the map are specified by an external input on the touch panel.

4. The navigation device according to claim 1, wherein the drag operation is performed while keeping the map fixed.

5. An information display device comprising:
   display means for displaying an image;
   input means, in the form of a touch panel integrally mounted with the display means, for receiving an input in response to an external contact by a finger of a user or a stylus;
   position detection means for detecting a starting position and an ending position of a line segment input by the input means;
   command button display means for displaying a command button on a portion of a display area of the display means; and
   command execution means for, when one of the starting position and the ending position of the line segment detected by the position detection means coincides with the command button, performing editing of an object on the image, wherein the object corresponds to the other one of the starting position and the ending position,
   wherein the object is edited by a drag operation between the command button and the object, wherein the user moves the finger or the stylus keeping contact with the touch panel between the object and the command button.

6. The information display apparatus according to claim 5, wherein the image displayed by the display means is a map, and the object is a mark on the map.

7. The information display apparatus according to claim 5, wherein, in the display area of the display means, coordinates inside a region where the command button is not displayed represent one of the starting position and the ending position of the line segment input by the input means.

8. An object creating method for creating an object on a map displayed on a display unit in a map display apparatus that displays the map based on map data, wherein an input unit is integrally formed with the display unit, the object creating method comprising:
   a displaying step of displaying, on a screen mounted integrally with the touch panel in the display unit, the map based on the map data and a command button for creating an object at a predetermined area on the display unit;
   a detecting step of detecting that a position corresponding to the command button and a point on the map displayed on the display unit have been specified; and
   a creating step of creating an object corresponding to the point on the map,
   wherein the step of creating includes a user performing a drag operation, whereby the user moves a finger or a stylus keeping contact with the touch panel between the command button and the point on the map.

9. A storage medium for storing a program to be executed by a computer in which a map is displayed on a display screen and a touch panel is integrally formed on the display screen, the program being stored so that the computer can read out the program, the program comprising:
   display processing for displaying, the map and a predetermined area on the display screen, wherein the predetermined area includes a command button for editing an object;
   receiving processing for receiving a line segment input when a drag operation is performed on the touch panel between the predetermined area and a desired point on the map on the touch panel by a user who moves a finger or a stylus keeping contact with the touch panel between the desired point on the map and the command button;
   detection processing for detecting starting position coordinates and ending position coordinates of the received line segment; and execution processing for, when one of the starting position coordinates and the ending position coordinates is located at the predetermined area, executing editing of an object on the map corresponding to the other one of the starting position coordinates and the ending position coordinates.

* * * * *